US007116849B2

(12) United States Patent
Kato

(10) Patent No.: US 7,116,849 B2
(45) Date of Patent: Oct. 3, 2006

(54) OPTICAL TRANSDUCER HAVING OPTICAL FIBER PLUG TRANSPARENT TO CURING LIGHT AND NON-TRANSPARENT TO SENSING LIGHT

(75) Inventor: Tadaharu Kato, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 55 days.

(21) Appl. No.: 10/933,952

(22) Filed: Sep. 3, 2004

(65) Prior Publication Data

US 2005/0077453 A1 Apr. 14, 2005

(30) Foreign Application Priority Data

Oct. 9, 2003 (JP) ............................ 2003-350854

(51) Int. Cl.
*G02B 6/00* (2006.01)
*G06M 7/00* (2006.01)

(52) U.S. Cl. ........................................................ 385/12

(58) Field of Classification Search .................. 385/12
See application file for complete search history.

(56) References Cited

U.S. PATENT DOCUMENTS 5,909,028 A 6/1999 Yamamoto
2003/0202753 A1* 10/2003 Kato et al. .................... 385/88
2003/0202754 A1 10/2003 Kato et al.

FOREIGN PATENT DOCUMENTS

JP 9-152525 6/1997

* cited by examiner

*Primary Examiner*—Frank G. Font
*Assistant Examiner*—Eric Wong
(74) *Attorney, Agent, or Firm*—Morrison & Foerster LLP

(57) ABSTRACT

An optical transducer includes a multi-port light emitting unit for distributing sensing light to minor bundles of optical fibers connected to input ports thereof and a multi-port light detecting unit for converting the sensing light to photo-current; an optical fiber plug, a socket and light detecting elements received in the socket are assembled in the multi-port light detecting unit; the optical fiber plug is made of semi-transparent colored synthetic resin, which is transparent to short-wavelength light and non-transparent to long-wavelength light, so that the minor bundles are adhered to the optical fiber plug through adhesive compound cured in the radiation of the short-wavelength light; the long-wavelength light serves as the sensing light so that leakage light does not reach the adjacent input ports.

20 Claims, 7 Drawing Sheets

OPTICAL TRANSDUCER HAVING OPTICAL FIBER PLUG TRANSPARENT TO CURING LIGHT AND NON-TRANSPARENT TO SENSING LIGHT

FIELD OF THE INVENTION

This invention relates to an optical transducer and, more particularly, to an adhesive joint structure in an optical transducer.

DESCRIPTION OF THE RELATED ART

The optical transducer is a device that converts a non-electrical parameter, e.g. position, sound or pressure into electric signals through light. The optical transducers have found a wide variety of applications. One of the applicable technical fields is the musical instrument. The optical transducers are, by way of example, installed in the hybrid keyboard musical instrument. An automatic player piano and a mute piano are typical examples of the hybrid keyboard musical instrument, and the optical transducers convert the current position of moving objects such as keys and/or hammers to electric signals. The electric signals are supplied to a data processing system, and tones to be produced are determined through the analysis on the pieces of music data carried by the electric signals.

A typical example of the optical transducer is disclosed in Japanese Patent Application laid-open No. Hei 9-152525. The prior art optical transducer includes light emitting heads, light receiving heads, a multi-port light emitting unit, a multi-port light detecting unit and optical fibers. The multi-port light emitting unit is broken down into plural light emitting elements, a photo-shield socket and a transparent plug. The photo-shield socket is formed with plural holes, and the light emitting elements are respectively received in the holes. The transparent plug is formed with plural ports, and bundles of optical fibers are respectively inserted into the holes. The photo-shield plug and transparent socket are assembled into a holder, and the light emitting elements are respectively opposed to the bundles of optical fibers inside of the holder. Similarly, a photo-shield socket and a transparent plug are assembled into a holder, and the light detecting elements are opposed to bundles of optical fibers inside of the holder. The transparent plugs are made of acrylic resin.

A bracket is provided under the keys, and slits are formed in the bracket at intervals for the keys. The light emitting heads and light receiving heads are attached to the reverse surface of the bracket, and the light emitting heads are alternated with the light receiving heads. Each of the slits is located at a middle of the area between the light emitting head and the associated light receiving head, and the light emitting head is opposed to the light receiving head across the slit. On the other hand, the multi-port light emitting unit and multi-port light detecting unit are attached to the outer surface of the bracket remote from the light emitting heads and light receiving heads.

The multi-port light emitting unit is optically coupled to the light emitting heads through the optical fibers, and the light receiving heads are also optically coupled to the associated ports of the multi-port light detecting unit through other optical fibers. A bundle of optical fibers, i.e., several optical fibers are assigned to each of the ports, and are adhered to the transparent plug as follows.

First, a worker inserts the bundles of optical fibers into the associated ports of the transparent plug, and makes the leading ends of the bundles project from the ports. The bundles of optical fibers are temporarily tacked to the transparent plugs. Injection holes are formed in the transparent plugs, and are open at the inner ends thereof to the ports. Photo-cured liquid adhesive compound is injected into the injection holes, and is spread over the boundaries between the bundles of optical fibers and the inner surfaces of the transparent plugs.

Visible light is radiated through the transparent plugs to the boundaries, and makes the liquid adhesive compound cured. Thus, the bundles of optical fibers are adhered to the transparent plugs. The leading end portions, which project from the transparent plugs, are cut out from the bundles of optical fibers so that the bundles of optical fibers have the end surfaces coplanar with the end surfaces of the transparent plugs.

Shutter plates are attached to moving objects such as keys of a keyboard musical instrument, and are moved into and out of the bracket. The light emitting elements are sequentially energized so that red light is emitted to the associated bundle of optical fibers. The red light is propagated through the optical fibers of the associated bundle to the light emitting heads, and is radiated from the light emitting heads to the associated light receiving heads. If the shutter plate intersects the red light, the red light is modified with the shutter plate, and, thereafter, is incident on the associated light receiving heads. Although the red light was propagated through the optical fibers, which form in combination one of the bundles, the incident light is propagated from the light receiving heads through the optical fibers, which respectively belong to the different bundles, to the light detecting elements. The incident red light is converted to the photo-current by means of the light detecting elements. Since the amount of red light is varied with the current positions of the shutter plates, the amount of photo-current is also varied together with the amount of incident red light. Thus, the prior art optical transducer converts the current positions of the keys to the amount of photo-current.

The applicant searched the database for other related arts, and found the following four related arts, i.e., Japanese Patent Application laid-open No. 9-152525, U.S. Pat. No. 5,909,028 to Yamamoto, US 2003/0202753 A1 and US 2003/0202754 A1.

The admitted prior art is disclosed in Japanese Patent Application laid-open No. 9-152525. Another prior art optical transducer is disclosed in U.S. Pat. No. 5,909,028. Although the prior art optical transducer includes the light emitting elements and light detecting elements, Yamamoto is silent to the joint structure between the light emitting elements/light detecting elements and the optical fibers.

An optical transducer is disclosed in U.S. 2003/0202753 A1. The optical transducer includes the sensor heads, optical fibers, multi-core light emitting unit and multi-port light detecting unit, and the bundles of optical fibers are inserted into the ports. Although Kato et. al. teach that the optical fiber plug and light-emitting diode socket are made of transparent synthetic resin such as polycarbonate and acrylonitril-butadiene-styrene, i.e., ABS resin (see paragraphs [0045] and [0047]) and that the injection holes are formed in the optical fiber plug (see paragraph [0045]), Kato et. al. is silent to any optical characteristics of the transparent synthetic resin for the optical fiber plug and to any window or injection hole shared between the adhesive compound and the curing light.

Another optical transducer is disclosed in US 2003/0202754 A1. The optical transducer includes the sensor heads, optical fibers, multi-core light emitting unit and multi-port light detecting unit, and the bundles of optical fibers are inserted into the ports. However, Kato et. al. is silent to any optical characteristics of the synthetic resin for the optical fiber plug and to any window or injection hole shared between the adhesive compound and the curing light.

A problem is encountered in the prior art optical transducer in that the red light is leaked into the adjacent ports. In detail, when the red light arrives at the end surface of an optical fiber, the red light is output from the end surface, and is propagated to the associated light detecting element. However, all the red light is not incident on the associated light detecting element. The red light partially enters the transparent plug through the internal reflection on the end surface, by way of example, and is propagated to the adjacent port. Since another light detecting element is assigned the adjacent port, the leakage red light is incident on the adjacent light detecting element, and is converted to the photo-current. This means that the photo-current contains a non-ignoreable amount of noise component. Thus, the prior art optical transducer does not exactly convert the current position of the moving object to the photo-current.

The leakage light is also observed in the multi-port light emitting unit, and is propagated through the optical fibers to the light detecting elements. Thus, the leakage red light in the multi-port light emitting unit is causative of another noise component.

SUMMARY OF THE INVENTION

It is therefore an important object of the present invention to provide an optical transducer, which exactly converts the current position of a moving object to an electric signal.

The present inventor contemplated the problem inherent in the prior art optical transducer, and firstly made the plugs of non-transparent synthetic resin. The photo-shield plugs were effective against the leakage red light, and prevented the light detecting elements from the noise components. However, another problem was encountered in that the bundles of optical fibers were liable to fall out. The reason why the bundles of optical fibers fell out was that the adhesive compound was insufficiently cured due to the shortage of the visible light. Thus, there was a trade-off between the leakage light and the insufficient adhesion. The present inventor noticed that the plugs were to be non-transparent only to the light emitted from the light emitting elements, and concluded that the plugs were made of filter synthetic resin.

To accomplish the object, the present invention proposes to make multi-port parts transparent to curing light and non-transparent to detecting light. In accordance with one aspect of the present invention, there is provided a An optical transducer for converting a physical quantity of objects to electric signals, comprising, a light emitter for outputting sensing light, a photo-electric converter for converting the sensing light to electric signals representative of the physical quantity, plural outgoing optical fibers connected to the light emitter, and propagating the sensing light toward the objects for radiating the sensing light to the objects, and plural returning optical fibers connected to the photo-electric converter, and propagating the sensing light modified with the objects to the photo-electric converter, wherein one of the light emitter and the photo-electric converter comprises plural transducers for producing one of the sensing light and the electric signals and a holder maintaining the plural transducers inside thereof and including a plug portion formed with plural ports selectively receiving the plural outgoing optical fibers or the plural returning optical fibers in such a manner that the plural outgoing optical fibers or the plural returning optical fibers are secured to the plug portion by means of adhesive compound cured in a radiation of a curing light, in which the plug portion is made of synthetic resin having a transmission wavelength range substantially permitting the curing light to pass therethrough and a cutoff wavelength range different from the transmission wavelength range and substantially prohibiting the sensing light to pass therethrough.

In accordance with another aspect of the present invention, there is provided an optical transducer for converting a physical quantity of objects to electric signals comprising a light emitter for outputting sensing light, a photo-electric converter for converting the sensing light to electric signals representative of the physical quantity, plural outgoing optical fibers connected to the light emitter, and propagating the sensing light toward the objects for radiating the sensing light to the objects and plural returning optical fibers connected to the photo-electric converter, and propagating the sensing light modified with the objects to the photo-electric converter, wherein one of the light emitter and the photo-electric converter comprises plural transducers for producing one of the sensing light and the electric signals and a holder maintaining the plural transducers inside thereof and including a plug portion formed with plural ports selectively receiving the plural outgoing optical fibers or the plural returning optical fibers in such a manner that the plural outgoing optical fibers or the plural returning optical fibers are secured to the plug portion by means of adhesive compound cured in a radiation of a curing light, in which the plug portion has a light transmission sub-portion permitting the curing light to reach the adhesive compound between the plug portion and the plural outgoing optical fibers or the plural returning optical fibers and a prohibiting sub-portion preventing the ports from leakage light leaked from one of the ports.

BRIEF DESCRIPTION OF THE DRAWINGS

The features and advantages of the optical transducer will be more clearly understood from the following description taken in conjunction with the accompanying drawings, in which FIG. 10 is a perspective view showing yet another optical fiber plug according to the present invention.

DESCRIPTION OF THE PREFERRED EMBODIMENTS

First Embodiment

Figure 1:
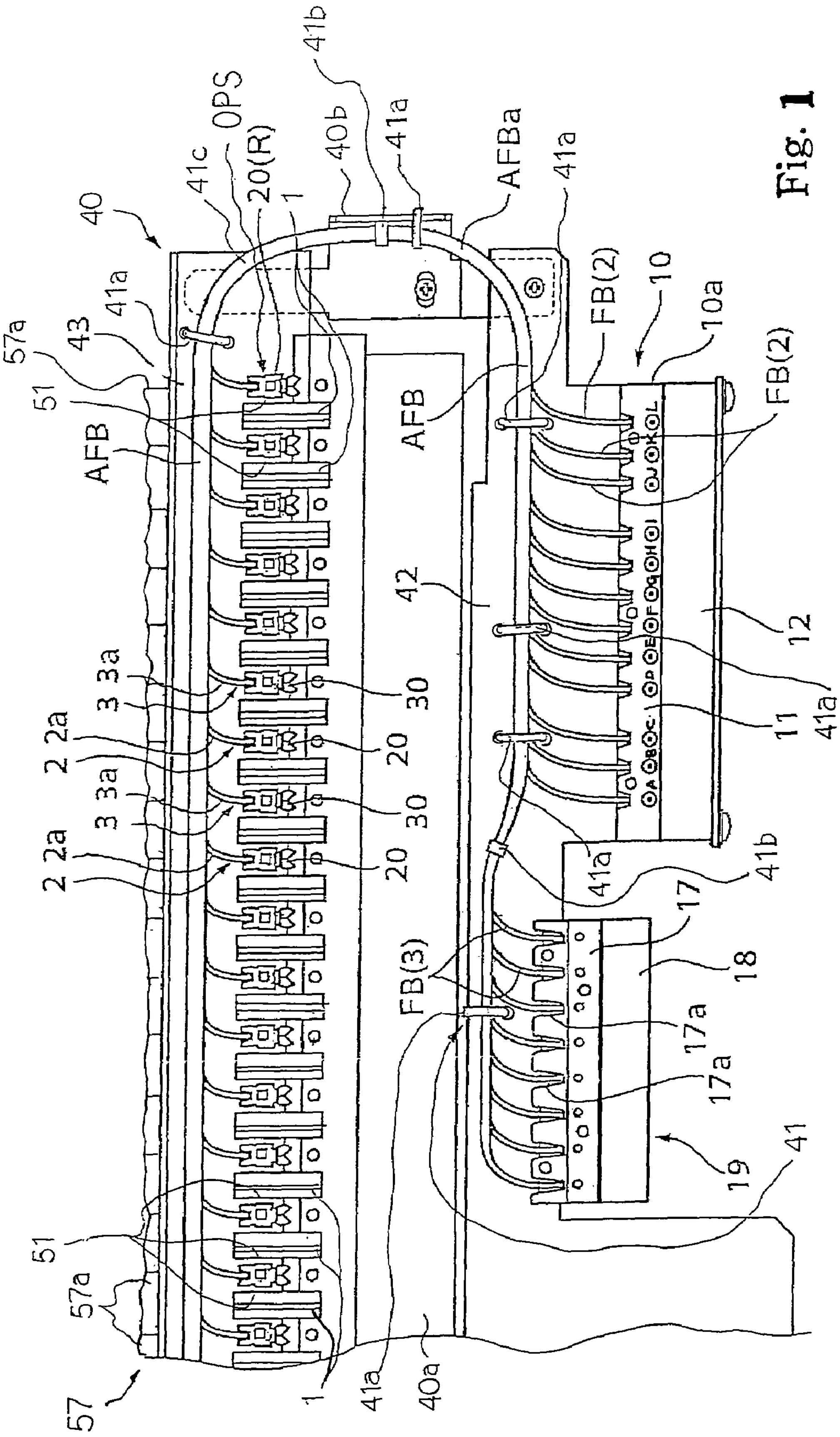
FIG. 1 is a plane view showing the layout of component parts of an optical transducer according to the present invention.
Figure 2:
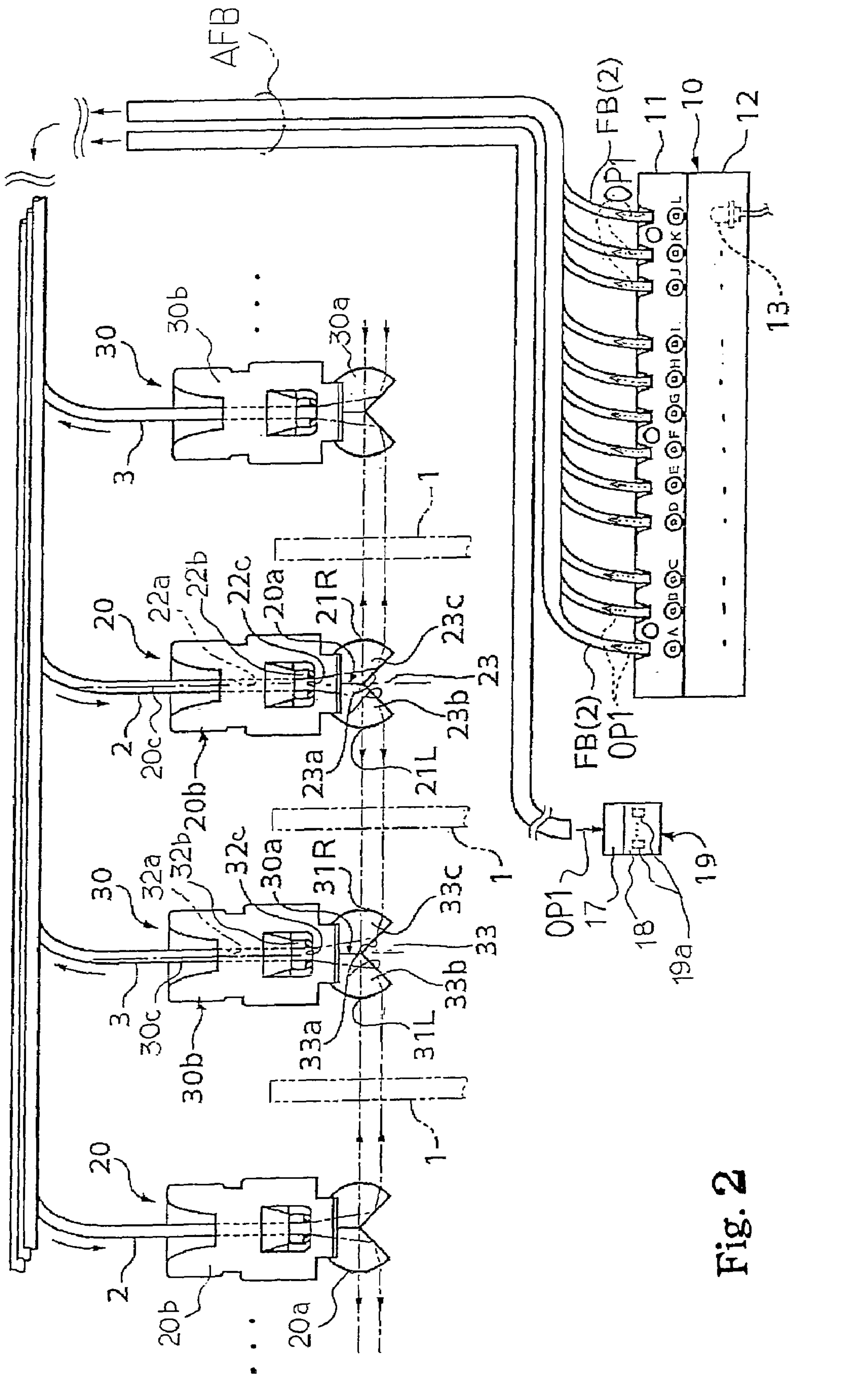
FIG. 2 is a plane view showing the arrangement of sensor heads incorporated in the optical transducer.

Referring to FIGS. 1 and 2 of the drawings, an optical transducer embodying the present invention largely comprises optical modulators 1 and a photo-electric converter OPS. The optical modulators 1 are respectively attached to moving objects such as, for example, keys 57*a,* which form parts of a keyboard 57 of an automatic player piano, and are moved together with the keys 57*a*. The photo-electric converter OPS radiates light beams across the optical modulators 1, and the light is modulated with the optical modulators 1 depending upon the current status of the keys 57*a*. In this instance, the current status means the positions of the keys 57*a* on the trajectories.

In the following description, terms "front" and "rear" are indicative of the relative positions, and the "front" is closer to a pianist who is fingering on a keyboard than the "rear". A line drawn between a front position and a corresponding rear position extends in the "fore-and-aft direction", and the fore-and-aft direction crosses a "lateral direction" at right angle. For example, the keys 57*a* are arrayed in the lateral direction.

The photo-electric converter OPS includes optical fibers 2/3, a multi-port light emitting unit 10, a multi-port light detecting unit 19, light radiating sensor heads 20 and light receiving sensor heads 30. The light radiating sensor heads 20, light receiving sensor heads 30 and optical fibers 2/3 are arranged on the upper surface of a base frame 40. In this instance, the multi-port light emitting unit 10 and multi-port light detecting unit 19 are located in front of the radiating sensor heads/light receiving sensor heads 20/30. The light radiating sensor heads 20 and light receiving sensor heads 30 are secured to the base frame 40, and are remote from the multi-port light emitting unit 10 and multi-port light detecting unit 19. The multi-port light emitting unit 10 and multi-port light detecting unit 19 are fixed to the base frame 40, and are connected to the light radiating sensor heads 20 and light receiving sensor heads 30 through the optical fibers 2 and optical fibers 3, respectively. The optical fibers 2/3 extend on a predetermined route on the reverse surface, and are fastened to the base frame 40 by means of a fastener 41. A cover plate (not shown) is secured to the base frame 40 so that the light radiating sensor heads 20 and light receiving sensor heads 30 are confined in the space between the base frame 40 and the cover plate. The cover plate prevents the light radiating sensor heads 20 and light receiving sensor heads 30 from the environmental light.

Description is made on the arrangement of the component parts 2/3, 10/19, 20/30, 40 and 41 in more detail. The light radiating sensor heads 20 and light receiving sensor heads 30 are alternately arranged in the lateral direction at intervals, and are remote from the multi-port light emitting unit 10 and multi-port light detecting unit 19. The multi-port light emitting unit 10 is slightly offset from the multi-port light detecting unit 19 in the fore-and-aft direction, and is laterally spaced from the multi-port light detecting unit 19.

In this instance, the base frame 40 is laterally elongated, and is separated into three sections, which are a central section 40*a*, a front section 42 and a rear section 43. The front section 42 and rear section 43 are respectively assigned to the light radiating sensor heads/light receiving sensor heads 20/30 and the multi-port light emitting unit/multi-port light detecting unit 10/19. Although a data processing module is further assigned to the front section 42, the data processor module is located on the left side of the multi-port light detecting unit 19, and is not shown in FIG. 1. The light radiating sensor heads 20 and light receiving sensor heads 30 are disposed onto the reverse surface of the rear section 43 at intervals, and slots 43*a* are formed in the rear section 43 at intervals. Each of the slots 43*a* is located in an area between the light radiating sensor head 20 and the adjacent light receiving sensor head 30, and is assigned to one of the optical modulators 1. The multi-port light emitting unit 10 and multi-port light detecting unit 19 are positioned between the rightmost light radiating sensor head 20(R) and the leftmost light radiating sensor head (not shown).

The central section 40*a* is contiguous to the rear section 43, and is retracted from the right sides of the front/rear sections 42/43. The gap between the front section 42 and the rear section 43 is bridged with a connecting plate 40*b* on the right side of the central section 40*a*, and the connecting plate 40*b* is fixed at the front end portion to the front section 42 and at the rear end portion to the rear section 43. Thus, the front section 42 is connected to the rear section 43 by means of the connecting plate 40*b* on the right side of the rightmost light radiating sensor head 20(R).

The optical fibers 2/3 laterally extend on the rear section 43 at the back of the light radiating sensor heads/light receiving sensor heads 20/30, and turn around in the right portion of the rear section 43. The optical fibers 2/3 pass over the connecting plate 40*b*. The optical fibers 2/3 turn around in the right portion of the front section 42, again, and laterally extend on the front section 42 at the back of the multi-port light emitting device/multi-port light detecting device 10/19. Thus, the optical fibers 2/3 are twice warped at the back of and in front of the connecting plate 40*b*. The optical fibers 2/3 are fastened to the rear section/connecting plate/front section 43/40*b*/42 by means of synthetic resin strips 41*a*, which form in combination the fastener 41, and the synthetic resin strips 41*a* make the optical fibers 2/3 immovable on the route.

The optical fibers 2/3 are made of transparent synthetic resin such as, for example, acrylic resin, and are of the order of 0.5 millimeter in diameter. In the following description, term "minor bundle" means a bundle of several optical fibers 2 or 3, and term "major" bundle is indicative of a bundle of the minor bundles. Five optical fibers 2 or 3 are, by way of example, bundled in a minor bundle FB(2) or FB (3). The major bundle of optical fibers 2/3 is labeled with "AFB". The major bundle AFB has a warped portion AFBa between the rightmost synthetic resin strip 41*a* on the rear section 43 and the rightmost synthetic resin strip 41*a* on the front section 42. The warped portion AFBa sideward projects on the right side of the light side surface 10*a* of the multi-port light emitting unit 10. The minor bundles of optical fibers 2 are labeled with "FB (2)", and the minor bundles of optical fibers 3 are labeled with "FB(3)". The minor bundles FB (2)/FB (3) are separated from the major bundle AFB on the front section 42 near the multi-port light emitting unit/multi-port light detecting unit 10/19, and the optical fibers 2/3 are separated from the minor bundles FB (2)/FB (3) on the rear section 43 in the vicinity of the associated light radiating sensor heads/light receiving sensor heads 20/30.

The multi-port light emitting unit 10 has twelve light output ports A/B/C/D/E/F/G/H/I/J/K/L, and sequentially emits the light from the twelve light output ports A–L. On the other hand, the multi-port light detecting unit 19 has eight light input ports 17*a*, and concurrently converts the light incident at the eight light input ports 17a to photo-current, i.e., electric signals. The optical fibers 2 are separated into the twelve minor bundles FB(2), and the twelve minor bundles FB(2) of optical fibers 2 are branched from the major bundle AFB of optical fibers 2/3 at intervals. The twelve minor bundles FB(2) are respectively assigned to the twelve light output ports A to L, and are respectively inserted into the light output ports A to L. The twelve bundles FB(2) are adhered to the inner surfaces, which define the light output ports A to L, respectively.

The eight light input ports 17a are assigned to the eight minor bundles FB(3) of the optical fibers 3, respectively. The major bundle AFB is branched into the eight minor bundles FB(3) at intervals, and the diverging points are on the right side of the associated light input ports 17a. The bundles FB(3) are warped for directing the light output end portions to the light input ports 17a, and the light output end portions are respectively inserted into the light input ports 17a of the multi-port light detecting unit 19. The light output end portions are adhered to the inner surfaces of the multi-port light detecting unit 19 by means of the adhesive compound.

The major bundle AFB laterally extends on the rear section 43 at the back of the array of the light radiating sensor heads/light receiving sensor heads 20/30, and the optical fibers 2 and optical fiber 3 are alternately branched from the major bundle AFB at intervals. The diverging points are on the right side of the associated light radiating sensor heads/light receiving sensor heads 20/30, and the optical fibers 2/3 have respective end portions 2a/3a between the diverging points and the light input/output end surfaces. The light radiating sensor heads 2 and light receiving sensor heads 3 are formed with rear holes, and the optical fibers 2/3 are individually inserted into the rear holes. The optical fibers 2/3 are adhered to the associated light radiating sensor heads/light receiving sensor heads 20/30 by means of the adhesive compound.

Turning to FIG. 2, the light radiating sensor heads 20 and light receiving sensor heads 30 are illustrated at a large magnification ratio. The light radiating sensor heads and light receiving sensor heads 20/30 are made of transparent material such as, for example, acrylic resin, and are identical in contour with one another. The transparent material may be shaped into the light radiating sensor heads/light receiving sensor heads 20/30 through a molding process.

Each of the light radiating sensor heads 20 is imaginarily broken down into a head 20a and a body 20b, and has a line of symmetry 20c. The optical fiber 2 is secured to the body 20b, and radiates the light to the head 20a. The head 20a splits the light into two light beams, and sideward outputs the light beams toward the light receiving sensor heads 30 on both sides thereof.

The body 20b is formed with a hole 22a, and the hole 22a is open to a pit 22b. The hole 22a has a centerline, which is coincident with the line of symmetry 20c. The optical fiber 2 passes through the hole 22a and pit 22b, and is tightly held in contact with an end surface 22c, which defines a part of the pit 22b. For this reason, the light is radiated from the optical fiber 2 toward the head 20a along the line of symmetry 20c. The optical fiber 2 is fixed to the body 20b so as to keep the face-to-face contact with the end surface 20c. Though not shown in FIG. 2, an injection hole is further formed in the body 20b, and is open to the hole 22a. Liquid adhesive compound is injected into the injection hole so that the optical fiber 2 is adhered to the inner surface.

The head 20a includes a pair of convex lenses 21L/21R and a pair of prisms 23b/23c. The prisms 23b/23c have respective reflecting surfaces 23a, and the reflecting surfaces 23a crosses each other at 90 degrees on the line of symmetry 20c. In other words, the reflecting surfaces 23a are inclined to the line of symmetry 20c at 45 degrees. The reflecting surfaces 23a form a V-shaped space 23. The convex lenses 21L/21R sideward project from the prisms 23b/23c, and are opposed to the adjacent light receiving optical sensor heads 30. The optical axes of the convex lenses 21L/21R cross the crossing line between the reflecting surfaces 23a.

The light is propagated from one of the light output port A, B, . . . or L through the optical fibers 2 to the light radiating sensor head 20, and is incident onto the end surface 22c. The output light proceeds to the reflecting surface 23a along the line of symmetry 20c. The output light is reflected on the reflecting surfaces 20a, and is split into two light beams. The light beams sideward proceeds, and are formed into parallel light beams by means of the convex lenses 21L/21R. Thus, the parallel light beams are output from the light radiating sensor head 20 toward the adjacent light receiving sensor heads 30.

The light receiving sensor head 30 is also broken down into a head 30a and a body 30b, and has a line of symmetry 30c. The head 30a and body 30b are identical with the head 20a and body 20b. For this reason, a hole, a pit, an end surface, reflecting surfaces, prisms, convex lenses and a V-shaped space, which are respectively corresponding to the hole 22a, pit 22b, end surface 22c, reflecting surfaces 23a, prisms 23b/23c, convex lenses 21L/21R and a V-shaped space 23, are labeled with references 32a, 32b, 32c, 33a, 33b/33c, 31L/31R and 33 without detailed description for the sake of simplicity.

The parallel light beams are incident on the convex lenses 31R/31L of the adjacent light receiving sensor heads 30, and are reflected on the reflecting surfaces 33a. The light beams are incident on the light input end surfaces of the optical fibers 3. The input light is propagated through the optical fibers, and reaches the different light input ports 17a of the multi-port light detecting unit 19.

The multi-port light emitting unit 10 includes an optical fiber plug 11, a light emitting diode socket 12 and light emitting elements 13. The light output ports A to L are formed in the optical fiber plug 11, and the light emitting elements 13, which may be implemented by light emitting diodes, are held inside the light emitting diode socket 12. The optical fiber plug 11 is assembled with the light emitting diode socket 12 so that the light emitting elements 13 are respectively opposed to the light output ports A to L. The optical fibers 2 are bundled to the twelve minor bundles FB(2), and the twelve minor bundles FB(2) are terminated at the light output ports A to L. Though not shown in the drawings, a driver circuit sequentially energizes the light emitting elements 13 with an electric driving pulse signal, and light pulses are emitted from the light emitting elements 13 to the light output ports A to L. The driving circuit repeatedly scans the light emitting elements 13 with the driving pulse signal so that the light pulses are distributed to the light radiating sensor heads 20 through the minor bundles FB(2) of the optical fibers 2. The light pulses have a wavelength fallen within the range of red. The red light, which serves as the light pulses, is hereinbelow referred to as "sensing light" OP1.

The multi-port light detecting unit 19 also includes an optical fiber plug 17, a light detecting diode socket 18 and light detecting elements 19a. The light input ports 17a are formed in the optical fiber plug 17, and the light detecting elements 13, which may be implemented by light detecting diodes or light detecting transistors, are held inside the light detecting diode socket 18. The optical fiber plug 17 is assembled with the light detecting diode socket 18 so that the light detecting elements 19*a* are respectively opposed to the light input ports 17*a*. The minor bundles FB(3) are terminated at the light input ports 17*a*, and the incident light, i.e., sensing light OP1 is converted to photo current. The optical fibers 3 are selectively assigned to the light input ports 17*a* in such a manner that the light is not concurrently output from more than one optical fiber 3 in each light input port 17*a*. The light is converted to the photo current through the light detecting elements 19*a*, and the photo-current is output from the multi-port light detecting unit 19 to the data processing module as key position signals.

The data processing module may drive the light emitting elements 13 to emit the light as disclosed in Japanese Patent Application laid-open No. Hei 9-152871. Twelve time slots are respectively assigned to the twelve light emitting elements 13, and are repeated until the electric power is removed from the data processing module. The twelve light emitting elements 13 are respectively energized in the time slots assigned thereto, and the sensing light OP1 is propagated through the optical fibers 2 to the light radiating sensor heads 20. The light beams are radiated to the adjacent light receiving sensor heads 30, and the incident light is propagated through the optical fibers 3 to the light detecting elements 19*a*, respectively. In other words, the sensing light OP1 returns to the light detecting elements 19*a*.

As described hereinbefore, the sensing light OP1 reaches each of the light detecting elements 19*a* through one of the optical fiber 3 of the associated minor bundle FB(3) in a time slot, and through another optical fiber 3 of the associated minor bundle FB(3) in the next time slot. Thus, the sensing light OP1 is input to each light detecting element 19*a* from the different optical fibers 3 of the associated minor bundle FB(3) in the twelve time slots. For this reason, the data processing module can specify the keys 57*a* on the basis of the combinations between the time slots and the light input ports 17*a*.

Turning back to FIG. 1, the moving objects, i.e., the optical modulators 1 are rotated about the rotational axes of the associated keys 57*a* on a balance rail (not shown), and penetrate the slots 43*a* into the space where the light radiating sensor heads/light receiving sensor heads 20/30 are installed. Each of the optical modulators 1 crosses associated one of the sensing light OP1. As will be hereinafter described in detail, a photo-modulating pattern or a gray scale is printed on the optical modulators 1, and the photo-shield material per unit area is varied on the optical modulators 1. For this reason, the amount of light incident on the convex lens 31L or 31R is varied together with the current position of the optical modulator 1.

Figure 3:
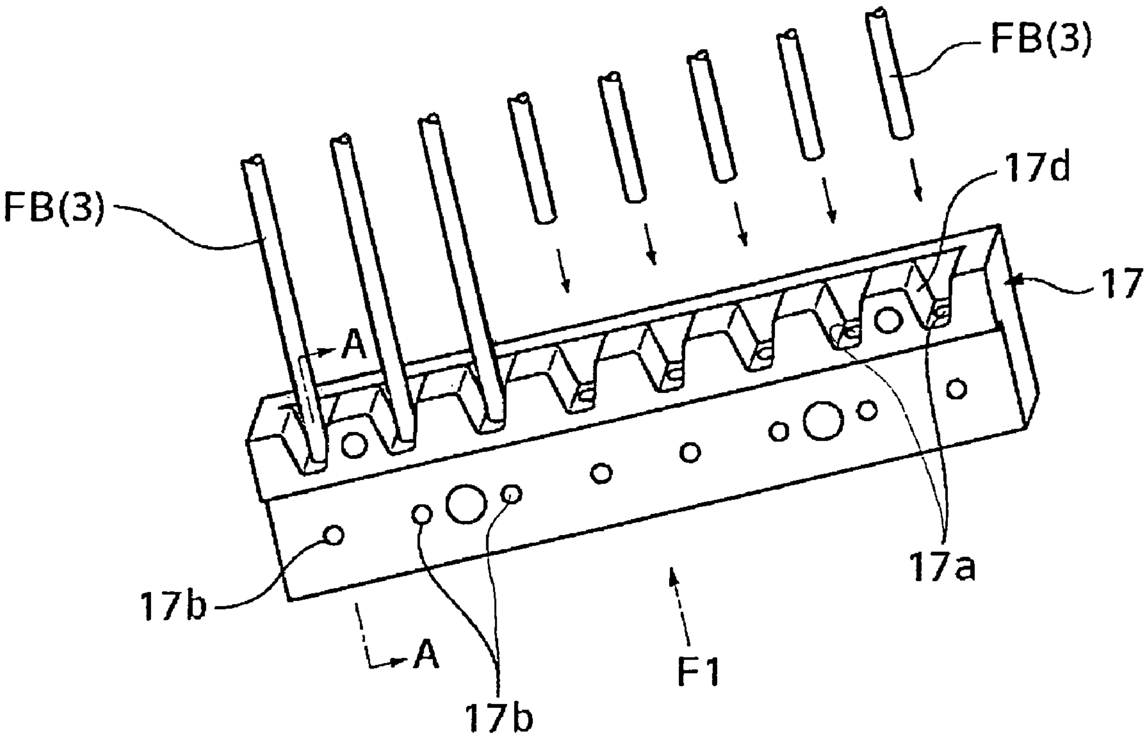
FIG. 3 is a perspective view showing an optical fiber plug and minor bundles of optical fibers connected to the optical fiber plug.

Turning to FIG. 3 of the drawings, the optical fiber plug 17, which forms a part of the multi-port light detecting unit 19 as described hereinbefore, has a generally rectangular parallelepiped configuration, and is made of semi-transparent colored synthetic resin. The semi-transparent colored synthetic resin is produced on the basis of transparent synthetic resin such as, for example, acrylic resin, which may be polymethylemetacrylate, and will be described hereinlater in more detail.

Figure 4:
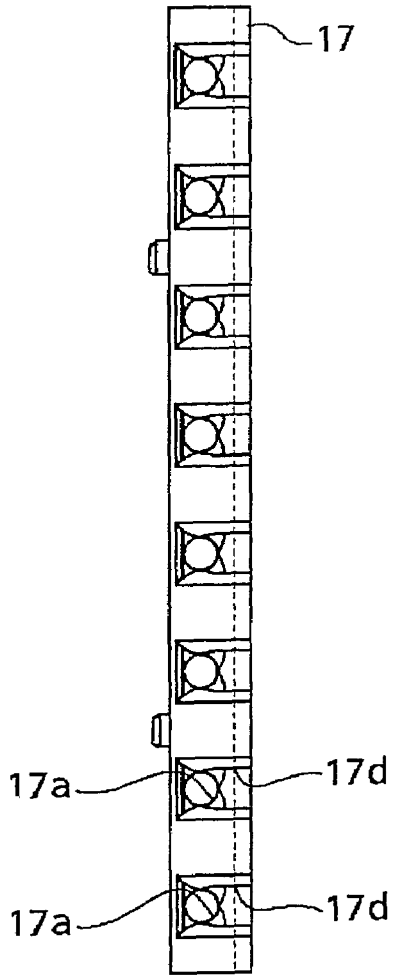
FIG. 4 is a bottom view showing input ports viewed in a direction indicated by arrow F1 of FIG. 3.
Figure 5:
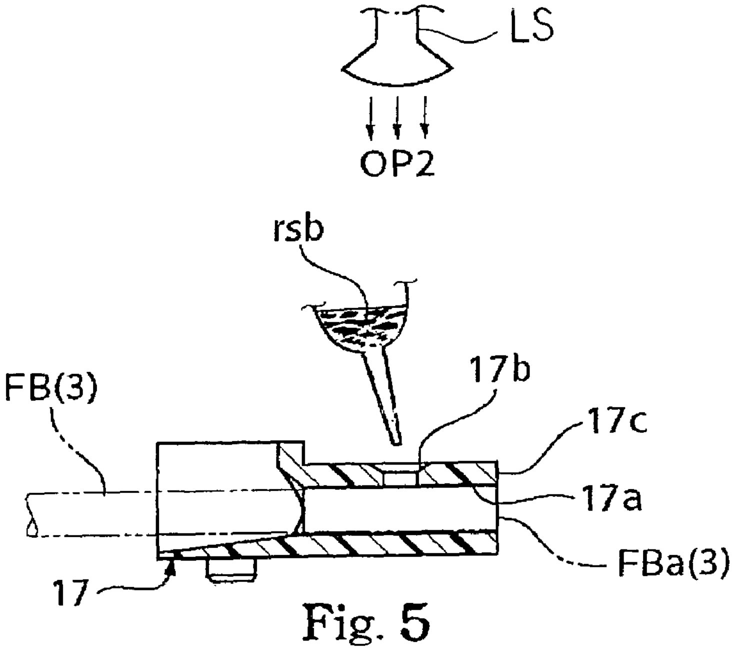
FIG. 5 is a cross sectional view taken along line A—A of FIG. 3 and showing an injection hole open to the input port.

The optical fiber plug 17 is formed with ridges 17*d* at intervals, and the input ports 17*a* are open to the bottoms of valleys between the ridges 17*d*. Since the ridges 17*d* have flared side walls, the minor bundles FB(3) of optical fibers are smoothly guided to the input ports 17*a*. The input ports 17*a* penetrate from the valleys to the bottom surface 17*c* of the optical fiber plug 17 (see FIGS. 4 and 5), and are cylindrical, the cross section of which is circular. The minor bundles FB(3) of optical fibers are respectively inserted into the input ports 17*a*, and are maintained in such a manner that the end surfaces of the minor bundles FB(3) are coplanar with the bottom surface 17*c*. Injection holes 17*b* are further formed in the optical fiber plug 17. The outer ends of the injection holes 17*b* are open to the outside on the side surface of the optical fiber plug 17, and the inner ends are respectively open to the input ports 17*a*. Liquid adhesive compound rsb is injected through the injection holes 17*b* into the input ports 17*a*, and is spread over the boundaries between the minor bundles FB(3) of optical fibers and the inner surfaces of the optical fiber plug 17.

Description is hereinafter made on an assembling work on the optical fiber plug 17. First, the worker prepares the optical fiber plug 17, minor bundles FB(3) of optical fibers, liquid adhesive compound and a light source LS. A curing light OP2 is to be radiated from the light source LS, and makes the liquid adhesive compound cured. The optical fiber plug 17 is made of the semi-transparent colored synthetic resin. Three sorts of coring agents such as pigments were mixed into acrylic resin, and the mixture was shaped into the optical fiber plug 17. The coloring agents or pigments change the relation between the permeability and wavelength, and make the optical fiber plug 17 tinged with blue.

Figure 6:
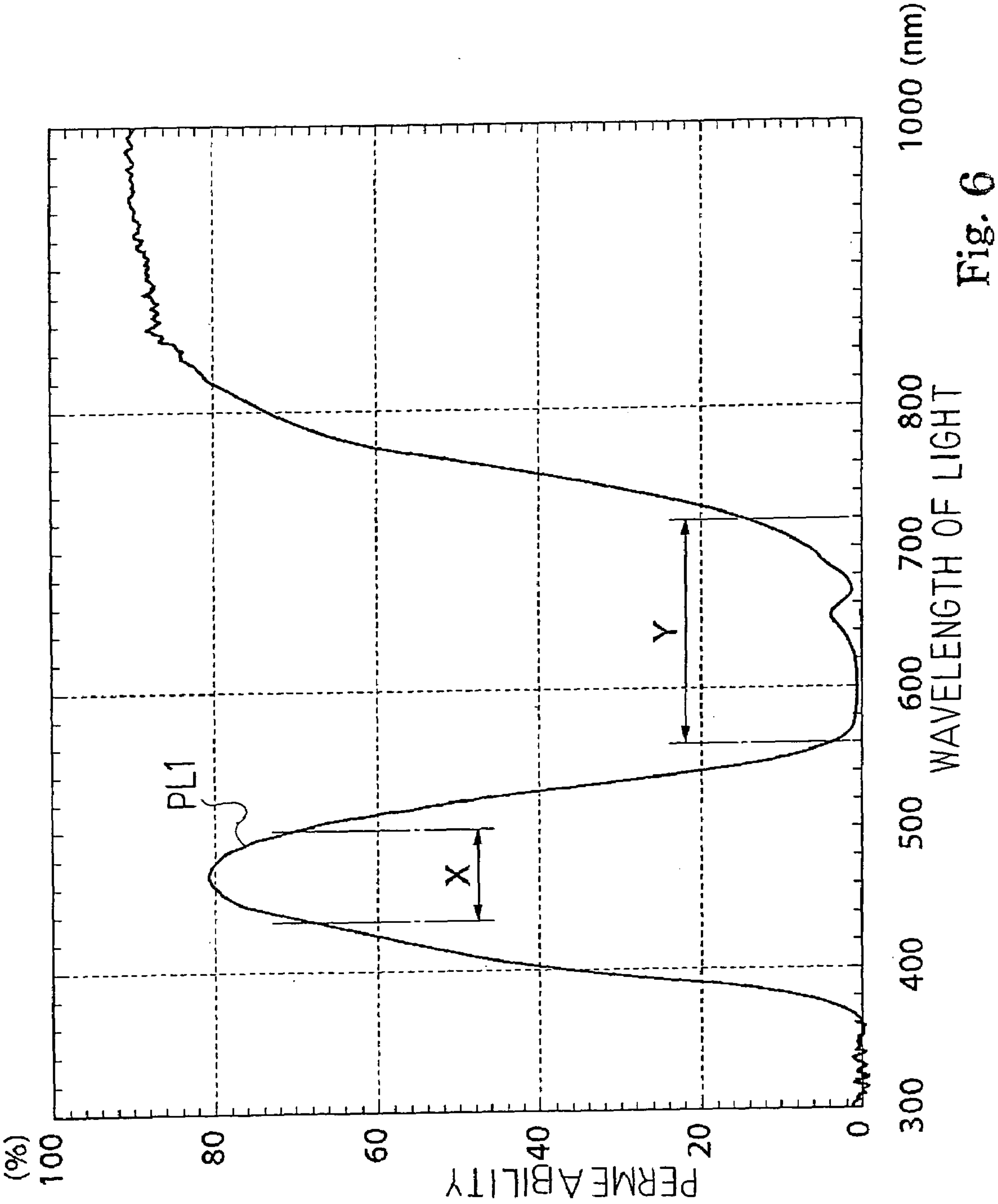
FIG. 6 is a graph showing a relation between light components and permeability of semi-transparent colored synthetic resin.

FIG. 6 shows the permeability of certain semi-transparent colored synthetic resin. The certain semi-transparent colored synthetic resin is commercially sold by Asahi Kasei Corporation as "Delpet (trademark)", which has the product code FIL A72, and "Delpet" belongs to the filter grade. The pigments were mixed with acrylic resin at a certain ratio, and the semi-transparent colored synthetic resin was formed into a sample. The permeability of the sample was measured. Plots PL1 stands for the permeability of the semi-transparent colored synthetic resin in terms of the wavelength of light. The plots PL1 were peaked around 470 nanometer wavelength, and bottomed out around 600 nanometer wavelength. In other words, the semi-transparent colored synthetic resin exhibited a high permeability in a transmission range "X" and a low permeability in a cutoff range "Y". When the transmission range "X" was set between 440 nanometers and 500 nanometers, the semi-transparent colored synthetic resin exhibited the permeability of the order of 70%. When the transmission range "X" was set between 460 nanometers and 480 nanometers, the permeability was increased to 80%. On the other hand, the cutoff range "Y" between 560 nanometers and 720 resulted in the permeability equal to or less than 14%. This meant that the semi-transparent colored synthetic resin could eliminate the 560 wavelength light component to the 720 wavelength light component from the incident light at least 86%. The transmission wavelength range was not overlapped with the cutoff wavelength range. Thus, the certain semi-transparent colored synthetic resin was available for the optical filter plug 17.

When a worker appropriately blends the pigments in the acrylic resin, the transmission range "X" and cutoff range "Y" are adjusted to target wavelength ranges. A method for coloring synthetic resin is, by way of example, disclosed by Aoba in a book entitled as "Check List for Plastic Injection Molding", Chapter 4, pages 162 and 163, and the book is published by Kogyo Chosakai Publishing Corporation ltd. Thus, the wavelength characteristics of the synthetic resin are arbitrarily designable by persons skilled in the art. For this reason, the present inventor had prepared a design specification sheet for the target light transmission characteristics, and requested a subcontractor to shape the certain semi-transparent colored synthetic resin into the sample.

The optical fiber plug 17 is made of the semi-transparent colored synthetic resin, which has the transmission range "X" for the curing light OP2 and the cutoff range "Y" for the sensing light OP1. Since the transmission range "X" is not overlapped with the cutoff range "Y", the sensing light OP1 is hardly leaked into the adjacent input ports 17*a*, and the curing light surely reaches the liquid adhesive compound. Thus, the optical fiber plug 17 according to the present invention serves as an optical filter.

The photo-cured liquid adhesive compound rsb is sensitive to the predetermined light component. There are various sorts of photo-cured adhesive compound, which are selectively sensitive to the visible light and ultra-violet light. The photo-cured liquid adhesive compound rsb is selected from those sorts of photo-cured adhesive compounds, and is sensitive to the 440 nanometer wavelength light component to the 500 nanometer wavelength light component in this instance. Such a photo-cured liquid adhesive compound is manufactured by Toa Gosei Corporation ltd., and is sold as "LCRO628A" (trademark). The photo-cured liquid adhesive compound "LCR0628A" is cured in the presence of the 440–500 nanometer wavelength light components within a short time period of the order of 30 seconds. The wavelength range to which the photo-cured adhesive compound is sensitive is hereinbelow referred to as "sensitive wavelength range".

The light source LS generates visible light, which serves as the curing light OP2. The visible light contains 400 nanometer wavelength light component to 500 nanometer wavelength light component, i.e., violet, indigo and blue. A mercury lamp or a halogen lamp is available for the curing light OP2. Thus, the light source LS is optimized depending upon the sensitive light components of the photo-cured liquid adhesive compound. It is desirable that the curing light OP2 is overlapped in light components with the transmission range "X" as much as possible. Nevertheless, even if the curing light OP2 contains light components outside of the transmission range "X", the photo-cured liquid adhesive compound is rapidly cured in the radiation in so far as the 440–500 nanometer wavelength light components occupy a substantial part of the curing light OP2. A possible relation among the wavelength range of the component lights in the curing light OP2, sensitive wavelength range and transmission range "X" may be expressed as "Curing light OP2" "Sensitive range" "Transmission range "X""

On the other hand, the sensing light OP1 contains the 560 nanometer wavelength light component to the 720 nanometer wavelength light component, and the 560–720 nanometer wavelength light components are fallen within the cutoff range "Y". For this reason, even if the sensing light OP1 is leaked from the input port assigned thereto due to the irregular reflection on the piece of adhesive compound rsb and the internal reflection on the end surface 17*c*, the optical fiber plug 17 permits only 4–14% of the reflection to pass therethrough. For this reason, the leakage light hardly reaches the adjacent input ports 17*a*.

As shown in FIG. 6, the permeability is varied in the cutoff range "Y", and is rapidly increased on both sides of the cutoff range "Y". In order to prevent the adjacent input ports 17*a* from the leakage light, it is desirable that the sensing light OP1 does not contain any light component outside of the cutoff range "Y".

The present inventor investigated the light components of the sensing light OP1, which did not reach the adjacent input ports 17*a*. When the cutoff range "Y" was narrowed to the wavelengths between 600 nanometers and 660 nanometer, the adjacent input ports 17*a* were almost perfectly prevented from the leakage light.

When the optical fiber plug 17, minor bundles FB(3) of optical fibers, liquid adhesive compound and light source LS are prepared, the worker inserts the minor bundles FB(3) of optical fibers into the input ports 17*a*, and makes the end portions project from the end surface 17*c*. The worker keeps the end portions of the minor bundles FB(3) projecting from the end surface 17*c*. The minor bundles FB(3) of optical fibers may be temporarily tacked to the optical fiber plug 17. The minor bundles FB(3) of optical fibers may have the end portions irregularly projecting from the end surface 17*a*.

Subsequently, the photo-cured liquid adhesive compound rsb is injected through the injection holes 17*b* into the input ports 17*a*. The photo-cured liquid adhesive compound rsb is spread over the boundaries between the end portions of the minor bundles FB(3) and the inner surfaces which define the input ports 17*a*.

Subsequently, the optical fiber plug 17 is exposed to the curing light OP2. The curing light OP2 passes through the optical fiber plug 17, and reaches the boundaries where the photo-cured liquid adhesive compound has been already spread. The optical fiber plug 17 permits the curing light OP2 to pass at 70% or more, and is almost transparent to the curing light OP2. For this reason, the adhesive compound rsb is cured so that the minor bundles (FB3) of optical fibers are adhered to the optical fiber plug 17.

Finally, the worker cuts out the end portions outside of the optical fiber plug 17 from the minor bundles FB(3). Then, the minor bundles FB(3) have the respective end surfaces FBa(3) substantially coplanar with the end surface 17*c* of the optical fiber plug 17.

The optical fiber plug 17, to which the minor bundles FB(3) have been already connected, is assembled with the light detecting diode socket 18 so that the end surfaces FBa(3) are opposed to the light detecting elements 19*a* inside of the multi-port light detecting unit 19. Since the input ports 17*a* are approximately equal in diameter to the minor bundles FB(3), the minor bundles FB(3) are substantially coincident with the optical axes of the light detecting elements 19*a* inside of the multi-port light detecting unit 19. The multi-port light detecting unit 19 is secured to the base frame 40, and the optical fibers 3 are connected to the light receiving sensor heads 30, respectively.

The multi-port light emitting unit 10 also includes the optical fiber plug 11. Although the leakage light is not so serious as that in the optical fiber plug 17, it is desirable to make the optical fiber plug 11 of the semi-transparent colored synthetic resin, which has been already described in conjunction with the optical fiber plug 17. The minor bundles FB(2) of optical fibers are connected to the optical fiber plug 11 through a method same as the above-described method for connecting the minor bundles FB(3) to the optical fiber plug 17. The output ports A to L are also prevented from the leakage light by virtue of the optical characteristics of the optical fiber plug 11 made of the semi-transparent colored synthetic resin.

As will be understood from the foregoing description, the optical fiber plugs 11/17 are transparent to the curing light OP2, and the sensing light OP1 is shielded in each port 17*a* and A-L by virtue of the optical fiber plugs 17/11 made of he semi-transparent colored synthetic resin. The liquid adhesive compound rsb is perfectly cured in the radiation of the curing light OP2, and the sensing light OP1 is confined in the associated input ports 17*a*. This results in that the optical light OP1 does not contain any noise without sacrifice of the adhesion between the minor bundles FB(2)/FB(3) and the optical fiber plugs 17/11. Thus, the optical transducer according to the present invention exactly converts the current position of the moving objects to the electric signals.

Second Embodiment

Figure 7:
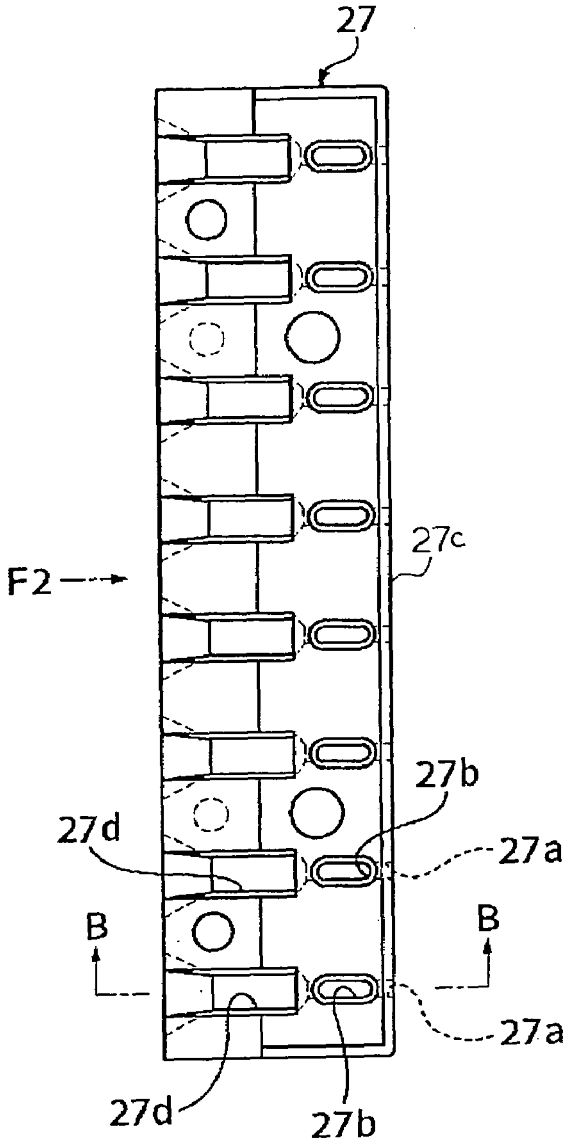
FIG. 7 is a front view showing an optical fiber plug forming a part of a multi-port light detecting unit incorporated in another optical transducer according to the present invention.
Figure 8:
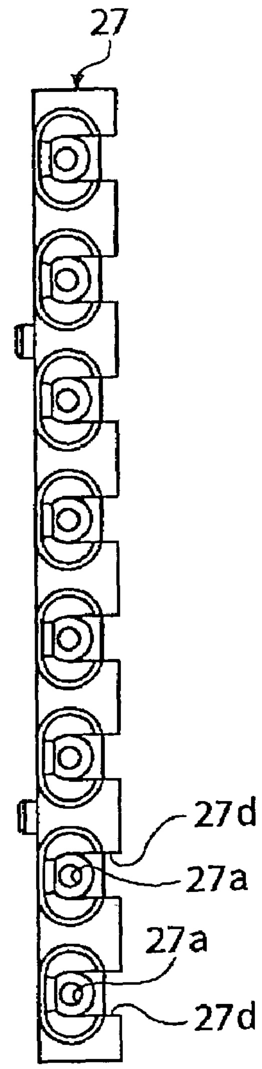
FIG. 8 is a plane view viewed in a direction indicated by arrow F2 in FIG. 7 and showing a top surface of the multi-port light detecting unit.
Figure 9:
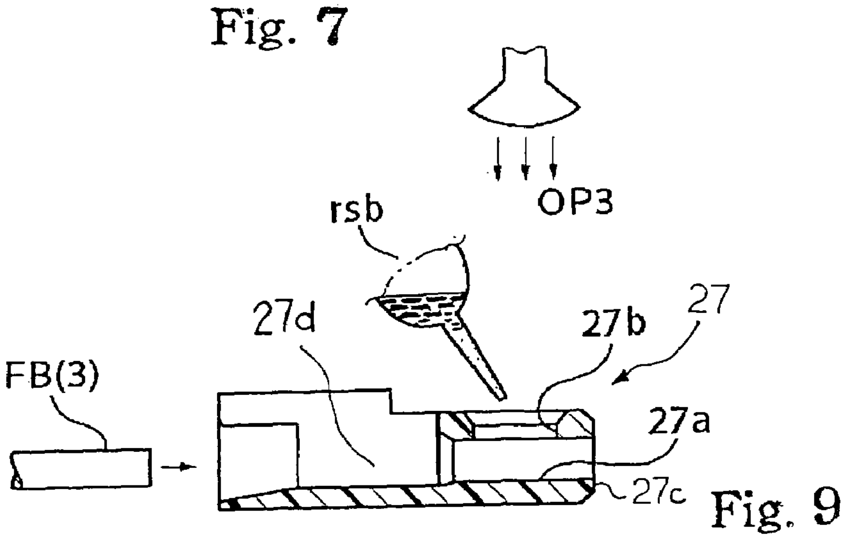
FIG. 9 is a cross sectional view taken along line B—B and showing the inside of the optical fiber plug.
Figure 1:
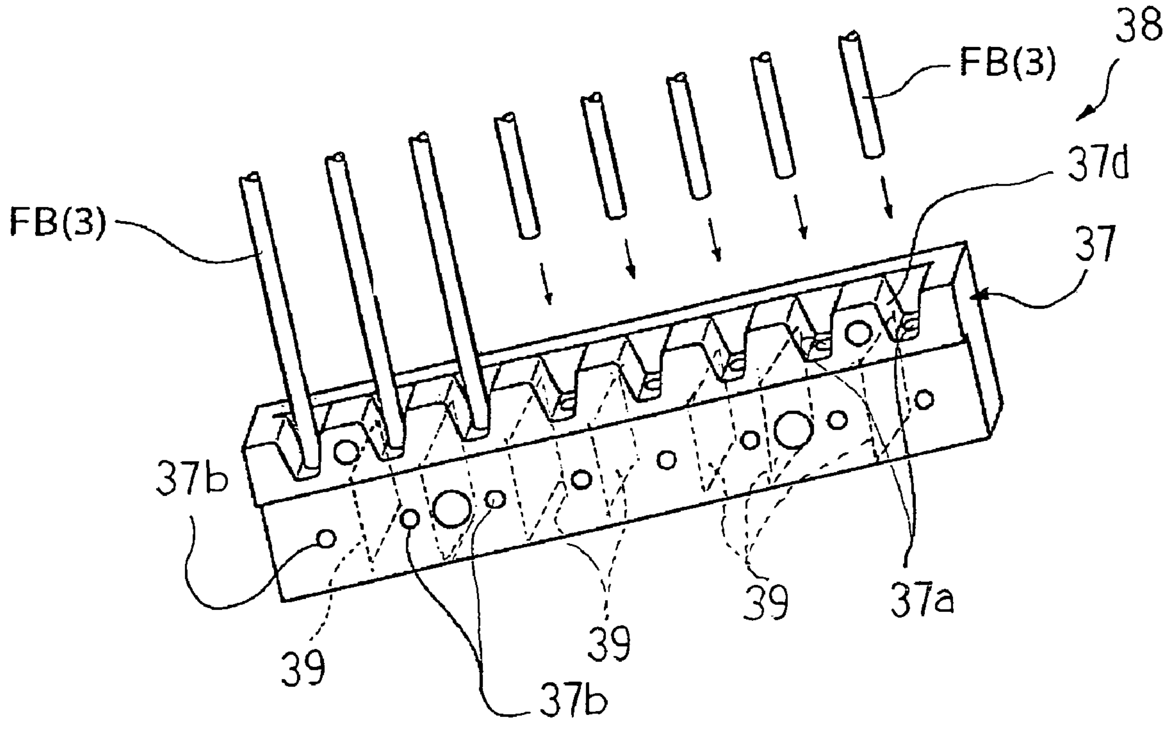

Referring to FIGS. 7, 8 and 9 of the drawings, an optical fiber plug 27 forms a part of a multi-port light detecting unit 29. The other parts of the multi-port light detecting unit 29 are similar to those of the multi-port light detecting unit 19. The multi-port light detecting unit 29 is incorporated in an optical transducer embodying the present invention, and the other component parts are similar to those of the optical transducer shown in FIG. 1. The other component parts of the optical transducer and other parts of the multi-port light detecting unit 29 are labeled with the references same as those designating the corresponding component parts of the optical transducer implementing the first embodiment. For this reason, description is hereinafter focused on the optical fiber plug 27.

The optical fiber plug 27 is formed with input ports 27*a*, which are respectively assigned to the minor bundles BF(3) of optical fibers. The input ports 27*a* are arranged in parallel to each other, and are open to the outside of the optical fiber plug 27 on the bottom surface 27*c*.

Guide grooves 27*d* are further formed in the optical fiber plug 27, and have respective center axes aligned with the center axes of the input ports 27*a*, respectively. The input ports 27*a* have a circular cross section. On the other hand, the guide grooves 27*d* have an elliptical opening on the top surface of the optical fiber plug 27, and are gradually constricted from the elliptical opening toward the input ports 27*a*. When a worker pushes the minor bundles FB(3) into the guide grooves 27*d*, the minor bundles FB(3) are guided to the input ports 27*a* along the inner surfaces, which define the guide grooves 27*d*.

The optical fiber plug 27 is further formed with injection holes 27*b*, and the injection holes 27*b* are associated with the input ports 27*a*, respectively. The injection holes 27*b* have an elliptical cross section, which is elongated in the direction parallel to the center axis of the associated input port 27*a*. The elliptical holes are as wide as the input ports 27*a*. The injection hole 27*b* is open to the outside of the optical fiber plug 27 on the front surface, and reaches the associated input port 27*a*. Thus, the input ports 27*a* are widely exposed to the outside through the injection holes 27*b*.

The optical fiber plug 27 is made of high-reflection non-transparent synthetic resin. Such a high-reflection non-transparent synthetic resin is sold in the market as ML4351 (Trademark) or LX2801 (Trademark), which are manufactured by Japan GE Plastic Corporation ltd. Of course, any high-reflection synthetic resin is available for the optical fiber plug 27 in so far as it belongs to the "high-reflection" grade. The high-reflection synthetic resin ML4351 is white, which is referred to as "super white", and can reflect the visible light with the wavelength equal to or longer than 450 nanometers at 90% or more. Since the standard white synthetic resin exhibits the reflectivity of the order of 60% to the visible light, the high-reflection synthetic resin ML4351 is almost non-transparent to the visible light.

The visible light, which contains light components equal in wavelength to or greater than 450 nanometers, is used as curing light OP3, and the minor bundles FB(3) of optical fibers are adhered to the optical fiber plug 27 by means of photo-cured transparent liquid adhesive compound sensitive to the visible light. The photo-cured liquid crystal adhesive compound is low in surface tension, and, accordingly, has high fluidity. The photo-cured transparent liquid crystal adhesive compound is transparent to at least the curing light so as to permit the curing light to pass therethrough.

The sensing light OP1 is, by way of example, used in the optical transducer implementing the second embodiment. The optical fiber plug 27 is non-transparent to the sensing light OP1. Even if the sensing light OP1 is leaked from one of the input ports 27*a*, the leakage light hardly reaches the adjacent input ports 27*a*. For this reason, the sensing light OP1 at the light detecting elements 19*a* merely contains an ignoreable amount of noise. This results in that the optical transducer can produce the electric signals exactly representing the current positions of the moving objects.

Description is hereinafter made on a connecting work. First, a worker prepares the optical fiber plug 27, minor bundles FB(3) of optical fibers, photo-cured transparent liquid adhesive compound and a source of the curing light OP3. The optical fibers, which form the minor bundles FB(3), are transparent, and have the critical angle of the order of 30 degrees with respect to the horizontal plane or the inner surface of the optical fibers.

The worker roughly aligns the minor bundle FB(3) of optical fibers to one of the guide grooves 27*d*, and pushes the minor bundle FB(3) into the guide groove 27*d*. The minor bundle FB(3) of optical fibers slides on the inner surface, which defines the guide groove 27*d*, and is smoothly guided to the input port 27*a*. The worker further pushes the minor bundle FB(3) of optical fibers into the optical fiber plug 27 until the end portion projects from the end surface 27*c*. The worker repeats the insertion, and the other minor bundles FB(3) of optical fibers also have the end portions projecting from the end surface 27*c*.

The worker temporarily tacks the minor bundles FB(3) of optical fibers to the optical fiber plug 27. The worker injects the photo-cured transparent liquid adhesive compound into the clearance between the minor bundles FB(3) and the inner surfaces of the optical fiber plug 27, and the photo-cured transparent liquid adhesive compound is smoothly spread over the clearance between the minor bundles FB(3) and the inner surfaces of the optical fiber plug 27.

Subsequently, the worker exposes the photo-cured transparent liquid adhesive compound to the curing light OP3. The curing light OP3 is incident through the injection hole 27*b* onto the minor bundle FB(3), and passes through the transparent optical fibers. The curing light OP3 reaches the inner surface, which defines the injection hole. As described hereinbefore, the optical fiber plug 27 is made of the high-reflection non-transparent synthetic resin so that the curing light OP3 is reflected on the inner surface. Since the photo-cured transparent liquid adhesive compound permits the curing light to be spread over the clearance between the minor bundles FB(3) and the inner surface of the optical fiber plug 27, the curing light OP3 penetrates the photo-cured transparent liquid adhesive compound in the clearances, and causes the adhesive compound cured. As described hereinbefore, the optical fiber plug 27 is made of the synthetic resin equal in reflectivity to or greater than 90%. Most of the curing light OP3 is multiply reflected on the inner surfaces, and makes the photo-cured transparent liquid adhesive compound rapidly cured. Thus, the minor bundles FB(3) of optical fibers are adhered to the optical fiber plug 27.

Finally, the worker cuts out the end portions, which project from the end surface 27*c*, from the minor bundles FB(3). Thus, the minor bundles FB(3) have respective end surfaces coplanar with the end surface 27*c*.

Thus, most of the curing light OP3 passes through the injection holes 27*b*, and is reflected on the inner surfaces of the optical fiber plug 27. The wider the injection holes 27*b*, the more the incident light. From this viewpoint, the elliptical injection holes 27*b* are preferable to the circular injection holes 17*b*.

Assuming now that the optical transducer has been already installed in a hybrid keyboard musical instrument such as, for example, an automatic player piano or a mute piano, while a pianist is fingering a piece of music on the keyboard, the multi-port light emitting unit 10 sequentially emits the light pulses, sensing light OP1 to the bundles FB(2) of optical fibers, and the light pulses are selectively radiated from the light radiating sensor heads 20 through the optical modulators 1 to the adjacent light receiving sensor heads 30.

The light pulses are modulated with the optical modulators 1 depending upon the current positions of the keys, and are incident on the light receiving sensor heads 30. The incident light, i.e., sensing light OP1 is propagated through the optical fibers 3 to the light input ports 27*a* of the multi-port light detecting unit 29. When the sensing light OP1 reaches the end surfaces of the optical fibers 3, the sensing light OP1 is radiated from the end surfaces to the light detecting elements 19*a*. Although the sensing light OP1 is incident on the inner surfaces, most of the incident light is reflected on the inner surface, and is directed to the associated light detecting elements 19*a*. Even if a negligible amount of sensing light OP1 enters the optical fiber plug 27, the sensing light OP1 hardly reaches the adjacent input ports 27*a*. Thus, the sensing light OP1 is confined in the associated input ports 27*a*, and the adjacent input ports 27*a* are free from the leakage light.

The multi-port light emitting unit 10 may be made of the high-reflection non-transparent synthetic resin as similar to the multi-port light detecting unit 19. The elliptical injection holes are formed in the multi-port light emitting unit 10 so as to permit the curing light to reach the clearance between the minor bundles FB(2) and the inner surfaces.

As will be understood from the foregoing description, the optical fiber plug 27 permits the curing light OP3 to reach the adhesive compound through the wide injection holes 27*b*, and does not allow the leakage light OP3 to reach the adjacent input ports 27*a* by virtue of the high-reflection non-transparent synthetic resin. The adhesive compound is surely cured in the curing light OP3 so that the bundles FB(3) are strongly adhered to the optical fiber plug 27. The sensing light OP1 is confined in the associated input port 27*a* so that the sensing light in the adjacent input ports do not contain the noise component.

Although particular embodiments of the present invention have been shown and described, it will be apparent to those skilled in the art that various changes and modifications may be made without departing from the spirit and scope of the present invention.

For example, the permeability at 70% for the transmission wavelength range does not set any limit to the technical scope of the present invention. The permeability is only influential in time period required for the photo-curing. Even if the permeability is changed to 60%, an additional time is merely required for the photo-curing, and is ignoreable.

It is preferable widely to space the transmission range "X" from the cutoff range "Y". Even if semi-transparent colored synthetic resin has the transmission range "X" close to the cutoff range "Y", the semi-transparent colored synthetic resin is available for the optical fiber plug 17 in so far as the semi-transparent colored synthetic resin exhibits the permeability different between the sensing light OP1 and the curing light OP2.

It is also preferable that the sensing light OP1 widely differs in wavelength from the curing light OP2. Even if the sensing light OP1 is partially overlapped in wavelength with the curing light OP2, the sensing light OP1 and curing light OP2 are available for the optical transducer according to the present invention in so far as another part of the sensing light OP1 and another part of the curing light OP2 are fallen within the cutoff rage "Y" and transmission range "X" of the semi-transparent colored synthetic resin.

The pigments do not set any limit to the technical scope of the present invention. Any additive is available for the semi-transparent synthetic resin in so far as the transmission range "X" and cutoff range "Y" take place in the optical characteristics of the synthetic resin. Some sorts of additives do not color the synthetic resin. Thus, the semi-transparent colored synthetic resin does not set any limit to the technical scope of the present invention.

Similarly, the acrylic resin does not set any limit to the technical scope of the present invention. Any sort of synthetic resin is usable as the base of the semi-transparent synthetic resin in so far as the additives make the synthetic resin exhibit the transmission range "X" and cutoff range "Y".

The optical transducer according to the present invention may be used for measuring current velocity of moving objects. If the optical modulator is formed with photo-shield bars at regular intervals, the current velocity is inversely proportional to the light pulse passing through the optical modulator and, accordingly, the duty ratio of the electric signal. Thus, the optical transducer is available for measuring the current velocity of the moving object. In a similar manner, the optical transducer is available for an acceleration of a moving object, dimensions of an object or a distance.

The optical fiber plug 27 made of the high-reflection non-transparent synthetic resin does not set any limit to the technical scope of the present invention. Since the reflection is expected on the inner surfaces of the optical fiber plug 27, a non-transparent optical fiber plug or a transparent optical fiber plug may have input ports coated with the high-reflection non-transparent synthetic resin.

The elliptical injection holes do not set any limit to the technical scope of the present invention. The injection holes may be a rectangle. In the second embodiment, the elliptical injection holes are shared between the supply of the photo-cured adhesive compound and the radiation of the curing light OP3. However, a photo-radiation window may be prepared independently of an injection hole. In other words, small injection holes and wide photo-radiation windows are formed in the optical fiber plug. In this instance, the worker injects the photo-cured adhesive compound into the input ports through the injection holes, and radiates the curing light to the injected adhesive compound through the photo-radiation windows. More than one photo-radiation window may be associated with each input port.

From the viewpoint that the input ports are to be prevented from the leakage light, photo-shield layers 39 or non-transparent walls may be embedded in an optical fiber plug 37 as shown in FIG. 10. References 37*a*, 37*b* and 37*d*designate input ports, injection holes and ridges, respectively, and the optical fiber plug 37 forms a part of a multi-port light detecting unit 38. The optical fiber plug 37 is made of transparent synthetic resin, and each of the photo-shield layers 39 or non-transparent wall is provided between the adjacent two input ports 39*a*. The photo-shield layers or non-transparent walls may be formed by black synthetic resin plates.

While a light source is radiating the curing light, the transparent optical fiber plug 39 permits the curing light to reach the boundaries between the minor bundles FB(3) and the inner surfaces of the optical fiber plug FB(3). The photo-cured adhesive compound is solidified, and causes the minor bundles FB(3) to be secured to the optical fiber plug 37. On the other hand, while the multi-port light emitting unit is sequentially distributing the sensing light to the minor bundles FB(2), the sensing light is output from the end surfaces of the minor bundles FB(3) into the input ports 37*a*, and most of the sensing light is incident on the associated light detecting elements. Although the transparent optical fiber plug 37 propagates the leakage light toward the adjacent input ports 37*a*, the photo-shield layers 39 or non-transparent walls prevent the adjacent input ports 37*a* from the leakage light. Thus, the photo-shield layers 39 or non-transparent walls are effective against the leakage light without sacrifice of the strong adhesion between the minor bundles FB(3) and the optical fiber plug 37.

The keyboard musical instrument does not set any limit to the application field of the optical transducer according to the present invention. The optical transducer may be installed in another sort of musical instrument such as, for example, an electronic percussion instrument or an electronic stringed musical instrument. The optical transducer according to the present invention may be installed in electronic goods, medical equipment and measuring equipment.

The multi-port light emitting unit 10 may be replaced with independent light emitting cells. Each of the light emitting cells includes a light emitting element and a coupler. The light emitting element is coupled to a minor bundle of optical fibers by means of the coupler.

The number of input ports does not set any limit to the technical scope of the present invention. Only two input ports may be formed in the optical fiber plug. More than eight input ports may be arranged in two rows.

The physically independent socket and plug do not set any limit to the technical scope of the present invention. A monolithic holder may be used for the minor bundles. In this instance, the light detecting elements are provided inside of the monolithic holder, and are opposed to input ports. The minor bundles are inserted into the input ports, and are connected to the monolithic holder by means of photo-cured adhesive compound.

The light radiating sensor heads 20 and light receiving sensor heads 30 do not set any limit to the technical scope of the present invention. The optical fibers 2 may be separated from the minor bundles FB(2), and directly radiate the sensing light to the optical fibers 3 respectively opposed to the optical fibers across the slits 51.

The moving objects do not set any limit to the technical scope of the present invention. The objects may be stationary. In this instance, the stationary objects may be scanned with the sensing light OP1.

The optical modulators 1 do not set any limit to the technical scope of the present invention. The objects may have photo-modulating capability. In this instance, the sensing light is directly modified by the objects, and any sensor head 20/30 is not required.

The arrangement of the sensor heads 20/30 does not set any limit to the technical scope of the present invention. In case where the sensing light is reflected on the optical modulators or objects, the light radiating sensor heads 20 are located on the same side as the light receiving sensor heads 30 with respect to the optical modulators 1 or moving objects 57*a*.

A single optical fiber may be received in each of the ports 17*a* or A-L. Thus, the bundles FB(2) and FB(3) do not set any limit to the technical scope of the present invention.

The liquid adhesive compound does not set any limit to the technical scope of the present invention. The photo-cured adhesive compound may be in the form of gel or a thin film.

The optical fiber plug 27 may be made of non-transparent synthetic resin non-transparent to the sensing light OP1 and semi-transparent to the curing light OP3. Thus, the high-reflection non-transparent synthetic resin does not set any limit to the technical scope of the present invention.

The component parts of the above-described embodiments are correlated with claim languages as follows. The current position is a "physical quantity". Of course, the physical quantity is not restricted to the current position as described hereinbefore. The optical modulators 1 or moving objects 57*a* are corresponding to "objects". The multi-port light emitting unit 10 serves as a "light emitter", and each of the multi-port light detecting units 19/29 serves as a "photo-electric converter". The optical fibers 2 and optical fibers 3 are corresponding to "plural outgoing optical fibers" and "plural returning optical fibers", respectively. The optical fiber plug 17/27/37/11 and associated socket 18/12 as a whole constitute a "holder". As described hereinbefore, the holder may have a monolithic structure. The optical fiber plug 17/27/37/11 serves as a "plug portion", and the light detecting diode socket 18 or light emitting diode socket 12 serves as a "socket portion". The light detecting elements 19*a* or light emitting elements 13 serve as "plural transducers".

The bundles FB(2) and bundles FB(3) are corresponding to "outgoing optical fiber bundles" and "returning optical fiber bundles", respectively. The pigments serve as "additives for changing a permeability in terms of wavelength of light".

What is claimed is:

1. An optical transducer for converting a physical quantity of objects to electric signals, comprising:

a light emitter for outputting sensing light;

a photo-electric converter for converting said sensing light to electric signals representative of said physical quantity;

plural outgoing optical fibers connected to said light emitter, and propagating said sensing light toward said objects for radiating said sensing light to said objects; and plural returning optical fibers connected to said photo-electric converter, and propagating said sensing light modified with said objects to said photo-electric converter, wherein one of said light emitter and said photo-electric converter comprises plural transducers for producing one of said sensing light and said electric signals, and a holder maintaining said plural transducers inside thereof and including a plug portion formed with plural ports selectively receiving said plural outgoing optical fibers or said plural returning optical fibers in such a manner that said plural outgoing optical fibers or said plural returning optical fibers are secured to said plug portion by means of adhesive compound cured in a radiation of a curing light, in which said plug portion is made of synthetic resin having a transmission wavelength range substantially permitting said curing light to pass therethrough and a cutoff wavelength range different from said transmission wavelength range and substantially prohibiting said sensing light to pass therethrough.

2. The optical transducer as set forth in claim 1, in which said plural outgoing optical fibers and said plural returning optical fibers form plural outgoing optical fiber bundles and plural returning optical fiber bundles, respectively, and said plural outgoing optical fiber bundles or said plural returning optical fiber bundles are received in said plural ports, respectively.

3. The optical transducer as set forth in claim 2, in which said plural outgoing optical fiber bundles or said plural returning optical fiber bundles are respectively opposed to said plural transducers in such a manner that said plural ports are spaced from one another by said plug portion.

4. The optical transducer as set forth in claim 3, in which said plug portion is further formed with ridges each projecting from between two of said plural ports for guiding said plural outgoing optical fiber bundles or said plural returning optical fiber bundles to respective entrances of said plural ports.

5. The optical transducer as set forth in claim 1, in which said synthetic resin is made of mixture of transparent synthetic resin and additives for changing a permeability in terms of wavelength of light.

6. The optical transducer as set forth in claim 5, in which said permeability is peaked in a short wavelength range where said transmission wavelength range is defined, and bottoms out in a long wavelength range where said cutoff wavelength range is defined.

7. The optical transducer as set forth in claim 5, in which said transparent synthetic resin and said additives are acrylic resin and pigments, respectively.

8. The optical transducer as set forth in claim 7, in which said acrylic resin is tinged with blue by virtue of said pigments.

9. The optical transducer as set forth in claim 7, in which said pigments cause said permeability to have said transmission wavelength range between 440 nanometers and 500 nanometers and said cutoff wavelength range between 560 nanometers and 720 nanometers.

10. An optical transducer for converting a physical quantity of objects to electric signals, comprising:

a light emitter for outputting sensing light;

a photo-electric converter for converting said sensing light to electric signals representative of said physical quantity;

plural outgoing optical fibers connected to said light emitter, and propagating said sensing light toward said objects for radiating said sensing light to said objects; and plural returning optical fibers connected to said photo-electric converter, and propagating said sensing light modified with said objects to said photo-electric converter, wherein one of said light emitter and said photo-electric converter comprises plural transducers for producing one of said sensing light and said electric signals, and a holder maintaining said plural transducers inside thereof and including a plug portion formed with plural ports selectively receiving said plural outgoing optical fibers or said plural returning optical fibers in such a manner that said plural outgoing optical fibers or said plural returning optical fibers are secured to said plug portion by means of adhesive compound cured in a radiation of a curing light, in which said plug portion has a light transmission sub-portion permitting said curing light to reach said adhesive compound between said plug portion and said plural outgoing optical fibers or said plural returning optical fibers and a prohibiting sub-portion preventing said ports from leakage light leaked from one of said ports.

11. The optical transducer as set forth in claim 10, in which said light transmission sub-portion is formed by windows open at inner ends to said plural ports and at outer ends to the outside of said plug portion on an outer surface of said plug portion, and said plug portion is made of non-transparent synthetic resin non-transparent to at least said sensing light so that said plug portion serves as said prohibiting sub-portion except for said windows.

12. The optical transducer as set forth in claim 11, in which said windows are elongated in a direction parallel to center axes of said plural ports.

13. The optical transducer as set forth in claim 11, in which said non-transparent synthetic resin exhibits a high reflectivity to said curing light so that part of said curing light is directed to said adhesive compound through a reflection on inner surfaces defining said plural ports.

14. The optical transducer as set forth in claim 13, in which said non-transparent synthetic resin exhibits the reflectivity equal to or greater than 90 % to visible light equal in wavelength to or greater than 450 nanometers.

15. The optical transducer as set forth in claim 11, in which said adhesive compound is introduced into said plural ports through said windows.

16. The optical transducer as set forth in claim 10, in which said plural outgoing optical fibers and said plural returning optical fibers form plural outgoing optical fiber bundles and plural returning optical fiber bundles, respectively, and said plural outgoing optical fiber bundles or said plural returning optical fiber bundles are respectively received in said plural ports.

17. The optical transducer as set forth in claim 16, in which said plural transducers have respective optical axes substantially aligned with respective centerlines of said outgoing optical fiber bundles or respective centerlines of said returning optical fiber bundles.

18. The optical transducer as set forth in claim 16, in which said plug portion is further formed with plural guide grooves respectively connected to said plural ports so that said plural outgoing optical fiber bundles or said plural returning optical fiber bundles are led to said plural ports through said guide grooves.

19. The optical transducer as set forth in claim 10, in which photo-shield layers are each embedded between said plural ports in said plug portion so as to serve as said prohibiting sub-portion, and said plug portion is made of transparent synthetic resin transparent to at least said curing light so that said plug portion serves as said light transmitting sub-portion except for said photo-shield layers.

20. The optical transducer as set forth in claim 19, in which said plug portion is further transparent to said sensing light so that said photo-shield layers prevent said plural ports from said sensing light leaked from adjacent plural port.

* * * * *